US012665399B2

(12) United States Patent
    Wu

(10) Patent No.: US 12,665,399 B2
(45) Date of Patent: Jun. 23, 2026

(54) WIRE PULLER HANDLE

(71) Applicant: Kuei-Kun Wu, Kaohsiung (TW)

(72) Inventor: Kuei-Kun Wu, Kaohsiung (TW)

( * ) Notice: Subject to any disclaimer, the term of this patent is extended or adjusted under 35 U.S.C. 154(b) by 329 days.

(21) Appl. No.: 18/595,760

(22) Filed: Mar. 5, 2024

(65) Prior Publication Data
    US 2025/0219365 A1      Jul. 3, 2025

(30) Foreign Application Priority Data

Dec. 29, 2023    (TW) ................................. 112151619

(51) Int. Cl.
    *H02G 1/08*          (2006.01)
    *B25G 1/10*          (2006.01)
(52) U.S. Cl.
    CPC ............. *H02G 1/081* (2013.01); *B25G 1/102* (2013.01)
(58) Field of Classification Search
    CPC .......... H02G 1/086; H02G 1/088; H02G 1/00; H02G 1/081; H02G 1/083
    See application file for complete search history.

(56) References Cited

U.S. PATENT DOCUMENTS

| | | | | |
|---|---|---|---|---|
| RE24,250 E | * | 12/1956 | Waldschmidt | ......... H02G 1/085 |
| | | | | 254/134.3 FT |
| 2019/0292009 A1 | * | 9/2019 | Gonsalves | ............. H02G 1/081 |
| 2021/0126438 A1 | * | 4/2021 | Bowles | .................. H02G 1/083 |
| 2025/0219365 A1 | * | 7/2025 | Wu | ......................... H02G 1/081 |
| 2025/0330000 A1 | * | 10/2025 | Wu | ......................... H02G 1/081 |

\* cited by examiner

*Primary Examiner* — Lee D Wilson
(74) *Attorney, Agent, or Firm* — MUNCY, GEISSLER, OLDS & LOWE, P.C.

(57)                ABSTRACT

A wire puller provided for conveyance of a pull cord, includes a grip, a base, a pinch roller set, and a guiding roller set. The grip is connected to the base and includes an adjustment part. The pinch roller set is pressed and limited by the adjustment part and includes a cover part pivotally connected to the base, a rotating body pivotally connected to the cover part, and two pinch rollers pivoted at two ends of the rotating body. The guiding roller set is arranged in an inner space of the base and includes a first guiding roller with a long shaft rod, a second guiding roller and a belt arranged on the first guiding roller and the second guiding roller. The wire puller handle is configured to drive the pull cord between the guiding roller set and the two pinch rollers by rotating the long shaft rod.

10 Claims, 19 Drawing Sheets

WIRE PULLER HANDLE

FIELD OF THE INVENTION

The invention relates to a wire puller handle, and more particularly to a wire puller handle for smooth and stable transportation of a pull cord in a take-up and pay-off device.

BACKGROUND OF THE INVENTION

Please refer to FIG. 1 and FIG. 2, most new houses or old houses with internal wiring will make exposed wirings hide into a closed conduit, and the wiring work is performed with a wire puller handle 1 transporting a pull cord 100 in a take-up and pay-off device 10. The wire puller handle 1 includes a handgrip body 11 made of metal, a pressing body 12 made of plastic material and pivoted at one side above the wire puller handle 1, and a fastener 13 pivoted in a center position of the wire puller handle 1. A belt 110 is disposed at one end of the handgrip body 11 by the wire puller handle 1, and a shaft rod 111 protrudes from one side of the belt 110 provided for combining with a power outlet with external power. The pressing body 12 is provided with grooves 121 at a front end of a peripheral edge thereof to match with the fastener 13, the grooves are arranged at intervals, and the fastener 13 is adjusted to move toward one of the grooves 121 to press the pull cord 100 by depending on different wire diameters of the pull cord 100.

Please refer to FIG. 1 and FIG. 2, the pull cord 100 includes a rough surface 101, the pressing body 12 presses on the rough surface 101 of the pull cord 100, and the inner surface 122 of the pressing body 12 is reciprocally rubbed by the rough surface 101 of the pull cord 100 to form a worn groove 123 due to a great resistance so that the wire puller handle 1 and the pull cord 100 are easy to be abrasion. The worn groove 123 of the pressing body 12 will be getting deeper after the wire puller handle 1 has been used for a period of time, and a resistance of the pressing body pressing on the pull cord 100 is reduced, and transportation of the pull cord 100 is hard to be driven, thereby the fastener 13 is required to be adjusted to move to one of the grooves 121 at a lower position so that the pressing body 12 presses on the pull cord 100 to increase the resistance to continue to use, as shown in FIG. 3 and FIG. 4.

Further, the grooves 121 of the pressing body 12 are not only limited by the different wire diameters and thicknesses of the pull cord 100, but also match with moving of the fastener 13. In other words, conventional wire puller handles cannot be adjusted to an applicable resistance to apply for the different wire diameters and thicknesses of the pull cord, if the resistance of the pressing body 12 pressing on the pull cord 100 is too great, the wire puller handle 1 and the pull cord 100 are easy to be abrasion; otherwise, if the resistance of the pressing body 12 pressing on the pull cord 100 is too small, transportation of the pull cord 100 is not smooth or hard to be driven.

Please refer to FIG. 1, FIG. 2, FIG. 3, and FIG. 4, the handgrip body 11 of the wire puller handle 1 is made of metal with heavy weight and fewer changes of shapes, which is not ideal for electricians to use in working sites, an overall structural composition of the wire puller handle 1 has a room for improvement.

SUMMARY OF THE INVENTION

A main object of the invention is to solve the problem that existing wire puller handles are unable to adjust the appropriate resistance to apply for the different wire diameters and thicknesses of the pull cord.

In order to achieve the above object, the invention provides a wire puller handle for smooth and stable transportation of a pull cord in a take-up and pay-off device. The wire puller handle includes a grip, a base connected In one embodiment, the wire puller handle provided for conveyance of a pull cord includes a grip, a base, a pinch roller set, and a guiding roller set. The grip includes an adjustment part connected to one end of the grip. The base is provided with an inner space, and the grip is connected to a top of the base. The pinch roller set is pivotally connected to one end of the base and arranged below the adjustment part, and a position of the pinch roller set limited by the adjustment part. The pinch roller set includes a cover part pivotally connected at one end of the base, a rotating body pivotally connected to the cover part, and two pinch rollers are respectively pivoted at two ends of the rotating body. The guiding roller set includes a first guiding roller, a second guiding roller and a belt, the first guiding roller and the second guiding roller are located in the inner space, and the belt is located outside the first guiding roller and the second guiding roller and driven to rotate. The first guiding roller further includes a long shaft rod protruding from one end of the first guiding roller, and the wire puller handle is configured to drive the pull cord between the belt and the two pinch rollers by a rotation of the long shaft rod.

In one embodiment, the grip further includes a sleeving and fixing frame located at one end thereof, and a connection member located at the other end thereof. The sleeving and fixing frame includes an accommodating space located at one side thereof, an opening is communicated to the accommodating space, two adjustment slots are respectively located at two sides of the sleeving and fixing frame to communicate the accommodating space, and an assembly slot is located below the sleeving and fixing frame to communicate the accommodating space. The assembly slot further includes an abutting section and a guiding section located below the abutting section. The abutting section and the guiding section are respectively communicated with the accommodating space to assemble with the base. The guiding section is provided with a plurality of first fixing holes, and the connection member is provided with a plurality of second fixing holes. The adjustment part of the grip includes a first bolt passing through the two adjustment slots, a first sleeve is located in the accommodating space and penetrated by the first bolt to abut against two inner sides of the sleeving and fixing frame, and a rotary knob used to screw with the first bolt.

In one embodiment, the base further includes two base shelves arranged at intervals and opposed to each other. Each of the two base shelves is made of plastic materials and laterally formed with a placement groove for a projection made of metal materials to be placed into, and an exterior of each of the two base shelves provided with a support projection corresponding to the placement groove. The projection is provided with two first through holes respectively arranged at two ends thereof, two first apertures arranged between the two first through holes, and two first holes respectively arranged between one of the two first through holes and one of the two first apertures. The support projection is provided with two second through holes respectively arranged at two ends thereof, two second apertures arranged between the two second through holes, and two second holes respectively arranged between one of the two second through holes and one of the two second apertures. The plurality of first fixing holes of the guiding section are fixed to the two first apertures of the projection and the two second apertures of the support projection by a first fixing member so that the sleeving and fixing frame abuts against the base. Each of the two shelves includes a protruding member at one end close to the support projection, and a fixing portion located opposite to the protruding member. The protruding member includes a shaft hole, the fixing portion includes a locking section protruding located above thereof, and a third aperture located at one end of each of the two base shelves in opposition to the protruding member, and the locking section is provided with a plurality of screw holes. The plurality of screw holes are fixed to the plurality of second fixing holes by a plurality of second fixing members so that the connection member is assembled with two fixing portions of the two shelves.

In one embodiment, the base further comprises a plurality of spacer elements, and each of the plurality of spacer elements is provided with two screw bolts and a sleeve. The two fixing portions of the two base shelves are connected by one of the plurality of spacer elements by respectively penetrating two third apertures with the two screw bolts and screwing with the sleeve, thereby the sleeve shores up between the two fixing portions of the two base shelves. The two support projections and the two projections of the two base shelves are connected by two of the plurality of spacer elements by respectively penetrating the second holes and the first holes with the screw bolts and screwing with the sleeves, thereby the sleeves shore up between the two support projections of the two base shelves and the two projections.

In one embodiment, the cover part includes a recessed space, a shaft rod, a shaft joint body disposed at one end of the cover part, and two concave edges respectively adjacent to two sides of the shaft joint body. The rotating body includes a convex top member and two convex arms respectively and downwardly disposed along two sides of the convex top member. Each of the two pinch roller further includes a roller and a shaft stick, and an outer periphery of the roller is provided with an annular concave arc groove. The recessed space of the cover part is provided for the convex top member of the rotating body to be placed therein, and the convex top member is pivotally connected to the cover part by the shaft rod passed from one side to the other side of the cover part. The two convex arms move left and right in the cover part with the convex top member as an axis, and the two pinch rollers are respectively pivoted in two convex arms. The shaft joint body includes a fourth aperture corresponding to the shaft hole of the protruding member, and a rod. The rod of the shaft joint body passes through two shaft holes of two protruding member and the fourth aperture of the shaft joint body therebetween so that two sides of the shaft joint body of the cover part are respectively pivoted to two protruding members of the two shelves. The sleeving and fixing frame covers one end of the cover part opposite to the shaft joint body to assemble with the base, one end of the cover part opposite to the shaft joint body is movable up and down inside the accommodating space, and the first sleeve is arranged in the sleeving and fixing frame and above one end of the cover part opposite to the shaft joint body by adjusting and moving the first bolt driven by the rotary knob.

In one embodiment, the shaft joint body includes a concave arc opening located at one end thereof close to two protruding members, and the concave arc opening is larger than the annular concave arc groove of the roller.

In one embodiment, the first guiding roller is pivotally connected to one end of the two projections and rotates, the first guiding roller includes a driving gear and two first bushes, and the driving gear includes two first convex parts and four first blocks. The driving gear of the first guiding roller is provided with the two first convex parts at two ends, the long shaft rod protrudes from one of the two first convex parts of the first guiding roller, and outer diameters of the two first convex parts is smaller than that of the driving gear. Two ends of the driving gear of the first guiding roller are respectively provided with two of four first blocks, and two first blocks at each of two ends of the driving gear are relatively located with the two first convex parts as a center. Each of the two first bushes is provided with a hollow interior for each of the two first convex parts of the driving gear to be placed therein, one side of each of the two first bushes facing the driving gear is provided with a first abutting edge, and the first abutting edge is provided with two first notches opposite to each other for the two first blocks at one end of the driving gear to engage so that each of the two first bushes rotates together with the driving gear. The two first convex parts at two ends of the driving gear are respectively sleeved in two hollow interiors of the two first bushes, and two first bushes are respectively engaged with the two shelves with the two first through holes of the two projections and the two second through holes of the two support projections. The second guiding roller is pivotally connected to the other end of the two projections. The second guiding roller includes a driven gear and two second bushes, and the driven gear comprises two second convex parts and four second blocks. The two second convex parts are respectively located at two ends of the driven gear, and outer diameters of the two second convex parts is smaller than that of the driven gear. Two ends of the driven gear are respectively provided with two of four second blocks, and two second blocks at each of two ends of the driven gear are relatively located with the two second convex parts as a center. Each of the two second bushes is provided with a second hollow interior for the two second convex parts of the driven gear to be placed therein, one side of each of the two second bushes facing the driving gear is provided with a second abutting edge, the second abutting edge is provided with two second notches opposite to each other for the two second blocks at one end of the driven gear to engage so that each of the two second bushes rotates together with the driven gear, the two first convex parts at two ends of the driven gear are respectively sleeved in two second hollow interiors of the two second bushes, and two second bushes are respectively engaged with the two shelves with the two first through holes of the two projections and the two second through holes of the two support projections. The belt is provided with a rack therein, and the rack of the belt relatively meshes with the driving gear of the first guiding roller and the driven gear of the second guiding roller for rotation.

In one embodiment, the fixing portion includes an embedding portion and a plurality of protruding strips, the embedding portion is provided in the inner space and located at a side opposite to the plurality of screw holes, the embedding portion is designed to match with shapes of a side opposite to the plurality of screw holes of the fixing portion, the plurality of protruding strips are arranged at intervals in the inner space and located between the plurality of screw holes and the embedding portion, and the embedding portion further includes a slide rail and a third block arranged below the slide rail at one end close to the third aperture.

In one embodiment, wherein the grip is made of plastic materials.

In one embodiment, wherein the two pinch rollers are made of metal materials.

Through the foregoing disclosure, the present invention has the following characteristics compared with the prior art:

1. The wire puller handle of the present invention can adjust the position of the pinch roller by the adjustment part, so that the two pinch rollers evenly press the pull cord on the belt. By rotating the long shaft rod, the belt can smoothly drive the pull cord between the two pinch rollers and the belt, thereby the wire puller handle can easily adjust the position of the pinch roller set and provide appropriate pressure to all wires with different diameters.

2. The two pinch rollers of the pinch roller set of the present invention are made of metal, so that the pull cord and the pinch roller set are not easily damaged, and the pull cord can smoothly move during the process and the pinch roller set will not be worn by the rough surface of the pull cord.

3. The grip of the present invention is made of plastic material, which can protect the two pressure wheels, the shape of the grip can be varied to be ergonomic, and it would be convenient for electricians to hold the grip at the work site.

DETAILED DESCRIPTION OF THE PREFERRED EMBODIMENTS

Figure 1:
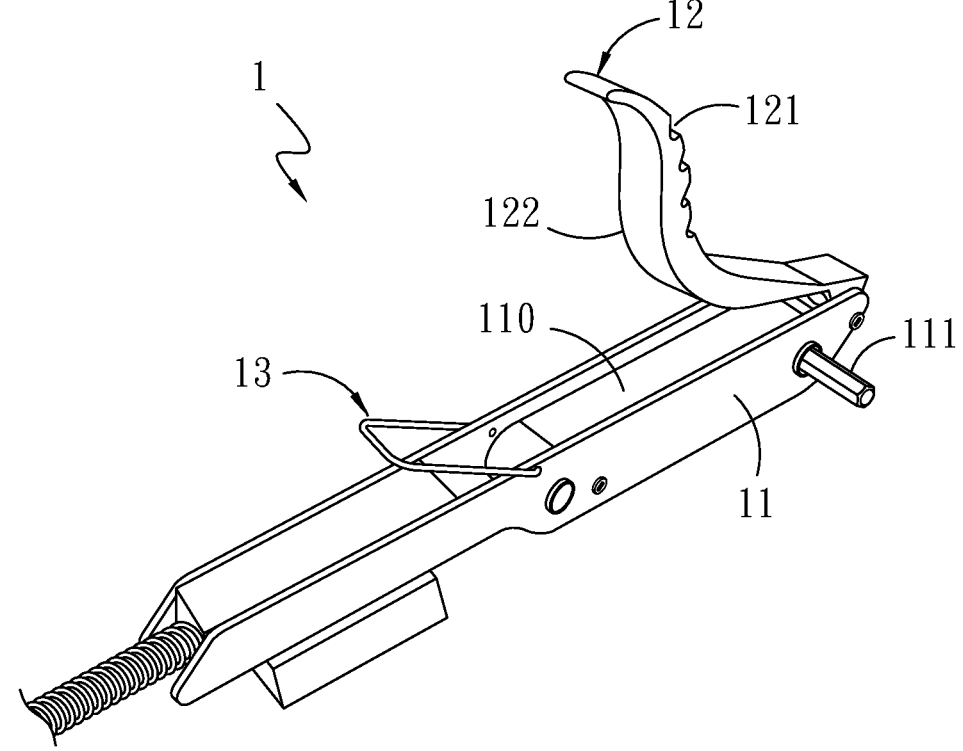
FIG. 1 is a schematic structural view of an existing wire puller handle.
Figure 2:
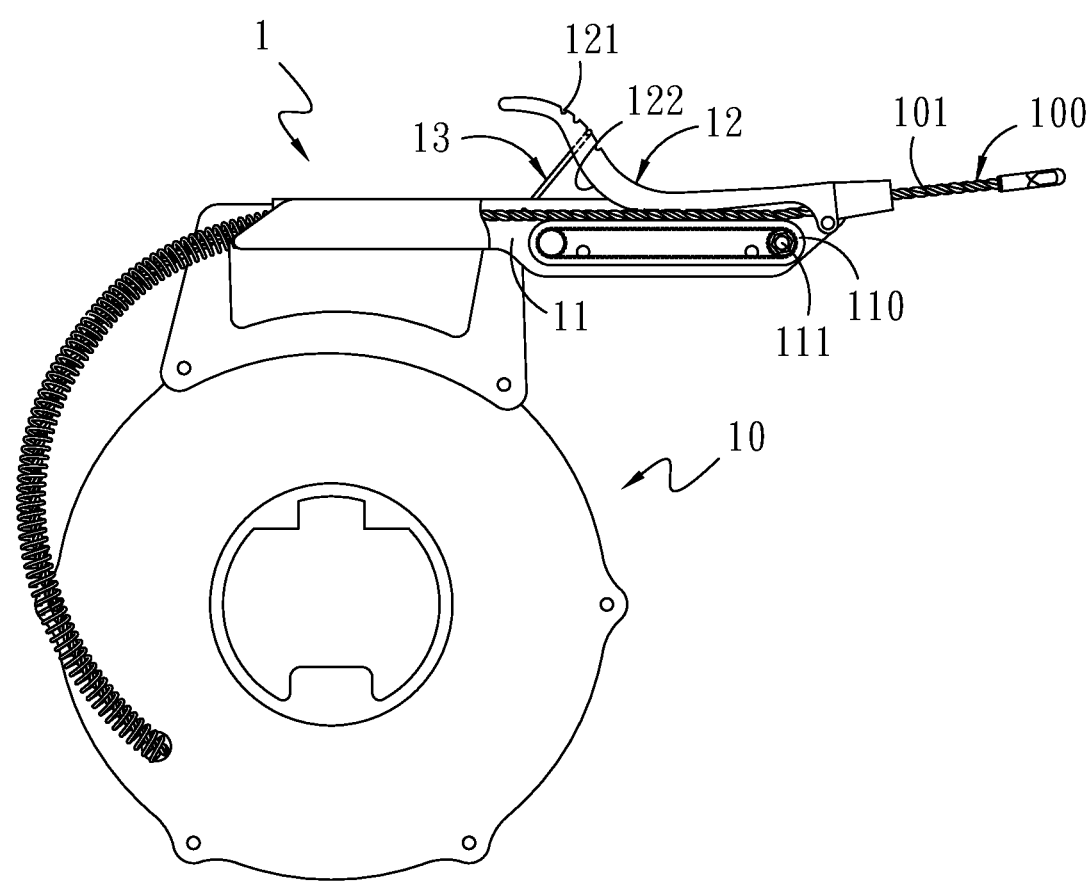
FIG. 2 is a front view of the existing wire puller handle of FIG. 1 with a pull cord.
Figure 3:
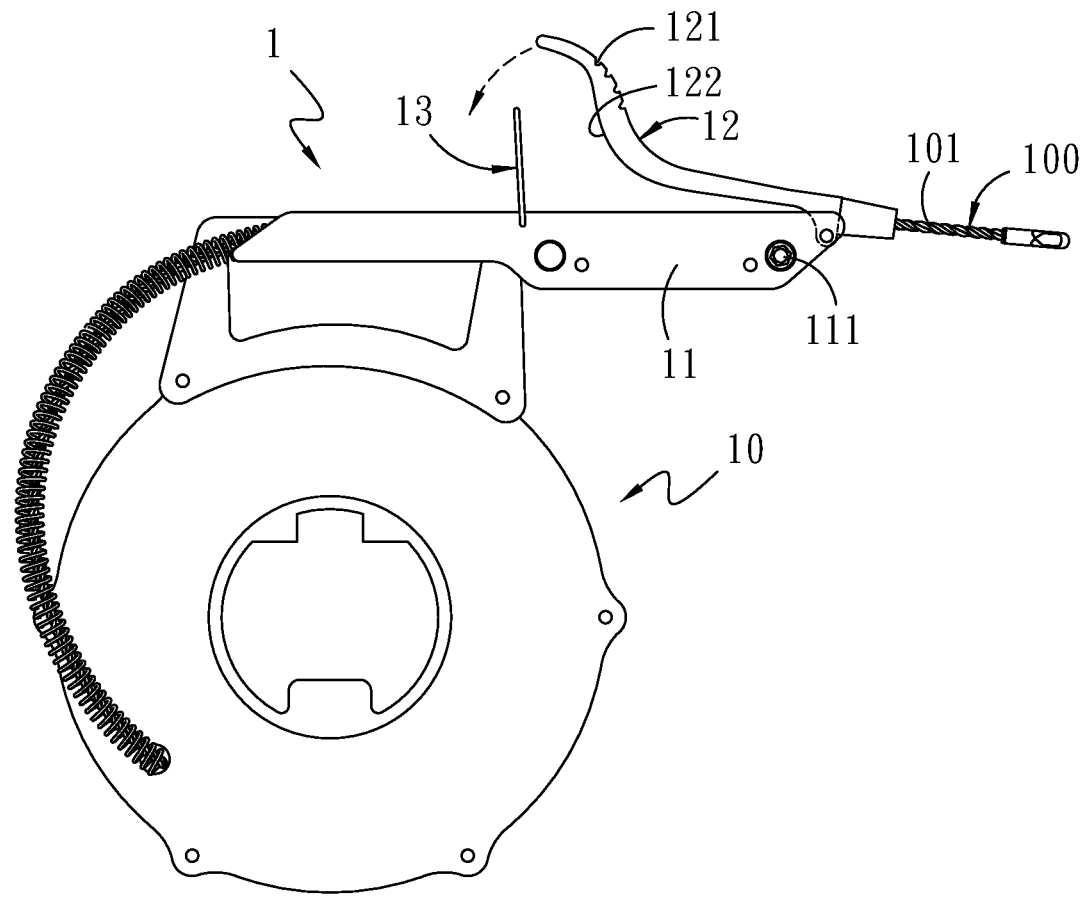
FIG. 3 is a schematic view of buckling a pressing body and a fastener of the existing wire puller handle of FIG. 2.
Figure 4:
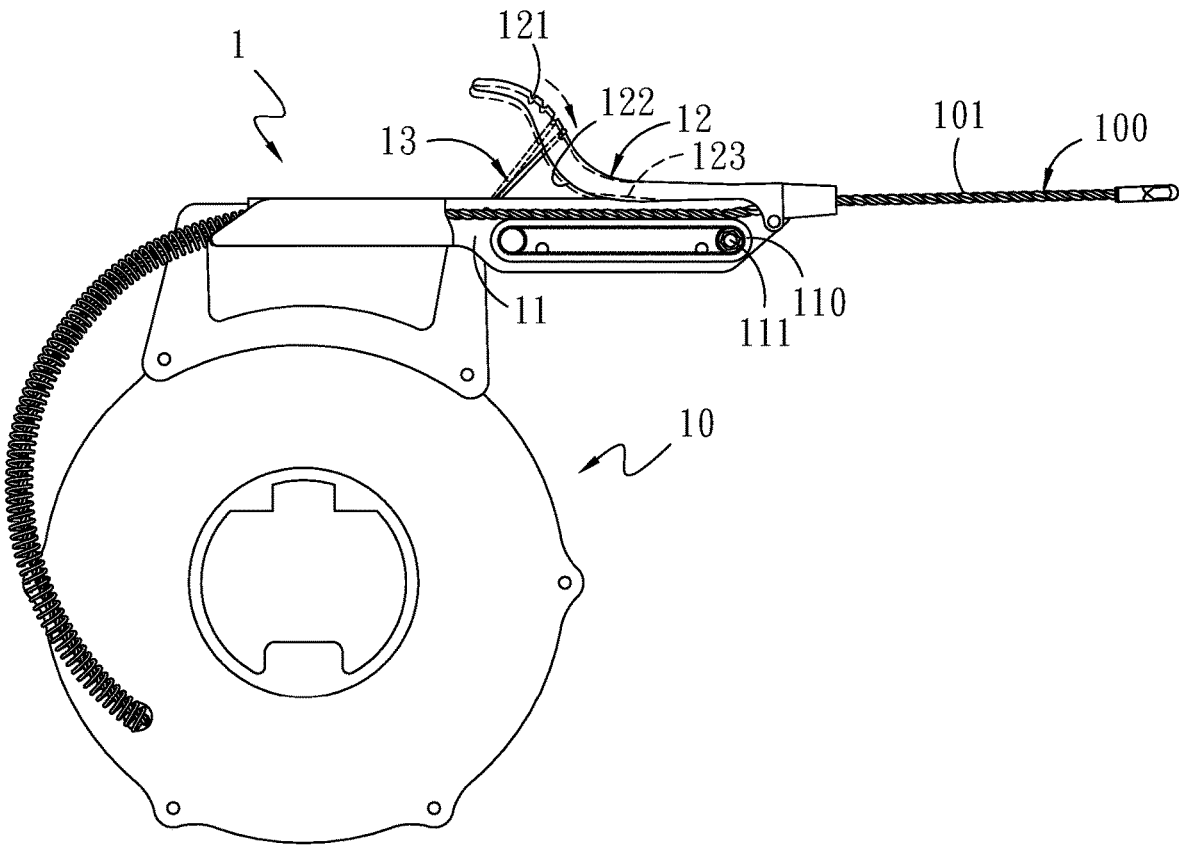
FIG. 4 is a schematic view of moving the fastener to buckle with stages-style grooves of FIG. 3.

The technical features and the mode of operation of this application are described below by giving preferred embodiments, together with accompanying drawings, in order for examination and reference.

Please refer to FIG. 5, FIG. 6, FIG. 7 and FIG. 8. The invention provides a wire puller handle 2, comprising a grip 3, a base 4, a pinch roller set 5, and a guiding roller set 6. The wire puller handle 2 is configured for smooth and stable conveyance of a pull cord 8 in a take-up and pay-off device 7.

Please refer to FIG. 5, FIG. 6, FIG. 7, FIG. 8, FIG. 9, and FIG. 10. The grip 3 includes a sleeving and fixing frame 31 located at one end of the grip 3, a connection member 32 located at the other end of the grip 3, and an adjustment part 33 connected to the grip 3 at one end where the sleeving and fixing frame 31 is located. The sleeving and fixing frame 31 includes an accommodating space 311 located at one side thereof, an opening 312 communicated to the accommodating space 311, two adjustment slots 313 respectively located at two sides of the sleeving and fixing frame 31 to communicate the accommodating space 311, and an assembly slot 314 located below the sleeving and fixing frame 31 to communicate the accommodating space 311. The assembly slot 314 further includes an abutting section 315 shaped in an inverted U at an upper portion thereof, and a guiding section 316 located below the abutting section 315, the abutting section 315 and the guiding section 316 are respectively communicated with the accommodating space 311 to assemble with the base 4. In one embodiment, an inner diameter of the abutting section 315 is smaller than that of the guiding section 316. The guiding section 316 is provided with a plurality of first fixing holes 317. The connection member 32 is provided with a plurality of second fixing holes 321. The adjustment part 33 includes a first bolt 331, a first sleeve 332, and a rotary knob 333, the first bolt 331 passes through the two adjustment slots 313 and moves up and down in any position in the two adjustment slots 313, the first sleeve 332 is hollow for the first bolt 331 penetration, the first sleeve 332 is located in the accommodating space 311 to abut against two inner sides of the sleeving and fixing frame 31 with two ends, the rotary knob 333 is screwed to the first bolt 331 to push the pinch roller set 5 to move toward the guiding roller set 6, and the rotary knob 333 is screwed tightly after the pinch roller set 5 is positioned.

Please refer to FIG. 5, FIG. 6, FIG. 7, and FIG. 8. The grip 3 is arranged above the base 4, two ends of the grip 3 are respectively connected to two ends of base 4. The base 4 includes two base shelves 41 arranged at intervals and opposed to each other, and an inner space is formed by the two base shelves 41 assembled. Each of the two base shelves 41 is made of plastic materials and laterally formed with a placement groove 42 for a projection 43 made of metal materials to be placed into, and an exterior of each of the two base shelves 41 is provided with a support projection 44 corresponding to the placement groove 42, so as to strengthen structures of the two base shelves 41 by the projection 43 and the support projection 44. In one embodiment, the projection 43 is provided with two first through holes 431 respectively arranged at two ends thereof, two first apertures 432 arranged between the two first through holes

431, and two first holes 433 respectively arranged between one of the two first through holes 431 and one of the two first apertures 432. The support projection 44 includes two second through holes 441 respectively arranged at two ends thereof, two second apertures 442 arranged between the two second through holes 441, and two second holes 443 arranged between one of the two second through holes 441 and one of the two second apertures 442. The two first through holes 431 of the projection 43 correspond to and communicate with the two second through holes 441 of the support projection 44. The plurality of first fixing holes 317 are fixed to the two first apertures 432 of the projection 43 and the two second apertures 442 of the support projection 44 by a first fixing member 318 such as a screw so that the sleeving and fixing frame 31 abuts against the base 4.

Figure 7:
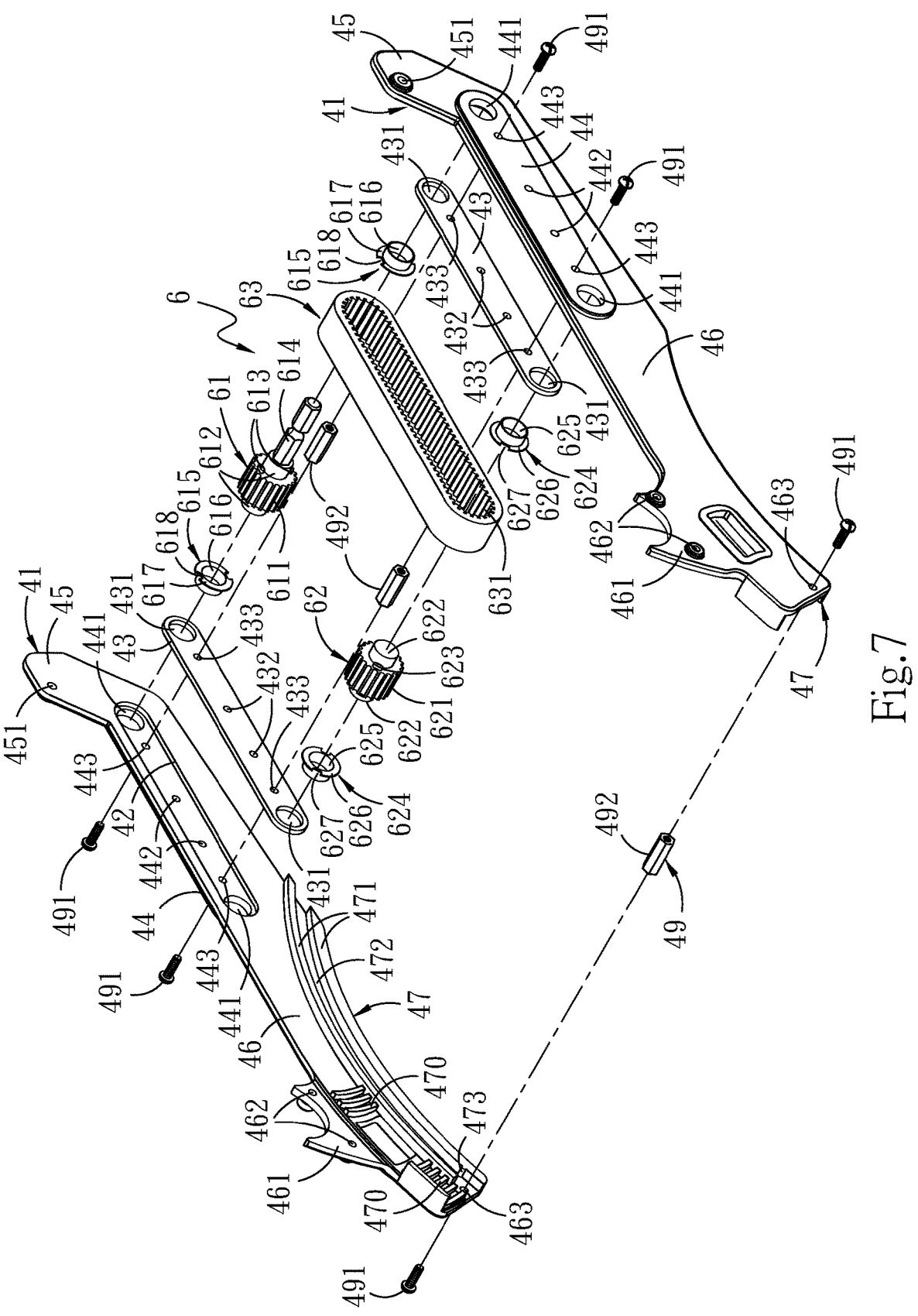
FIG. 7 is an exploded view of the base and the guiding roller set of FIG. 5.
Figure 8:
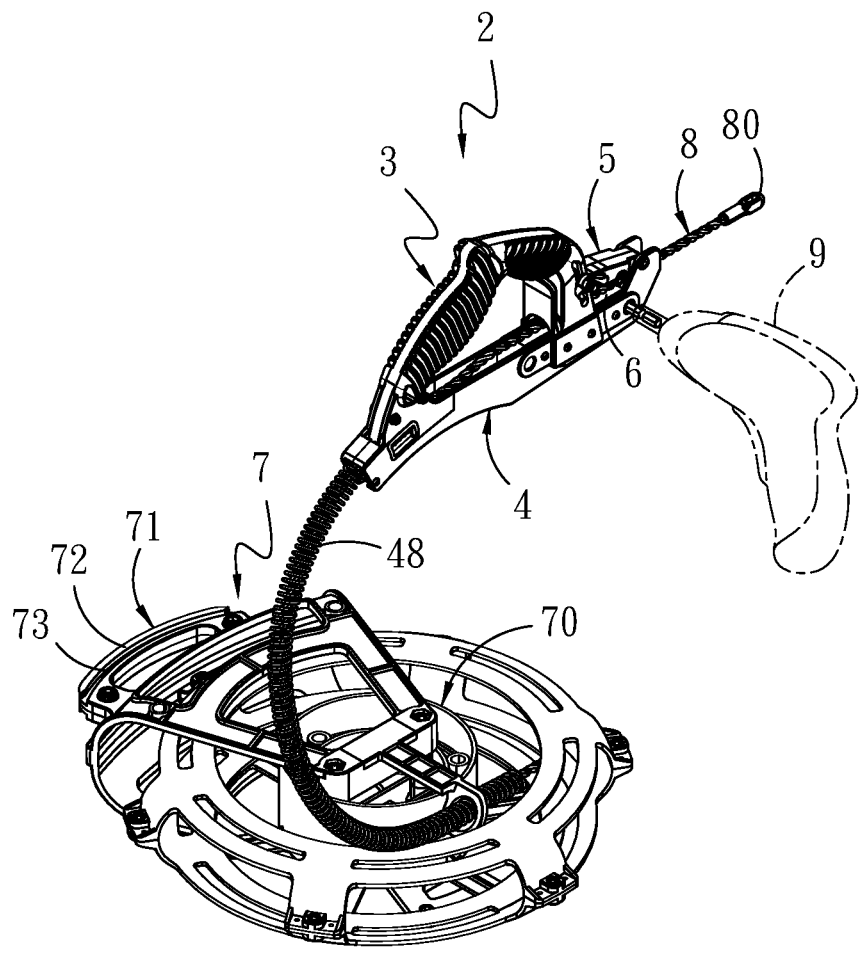
FIG. 8 is a schematic assemble view of the wire puller handle of the present invention and a take-up and pay-off device.
Figure 13A:
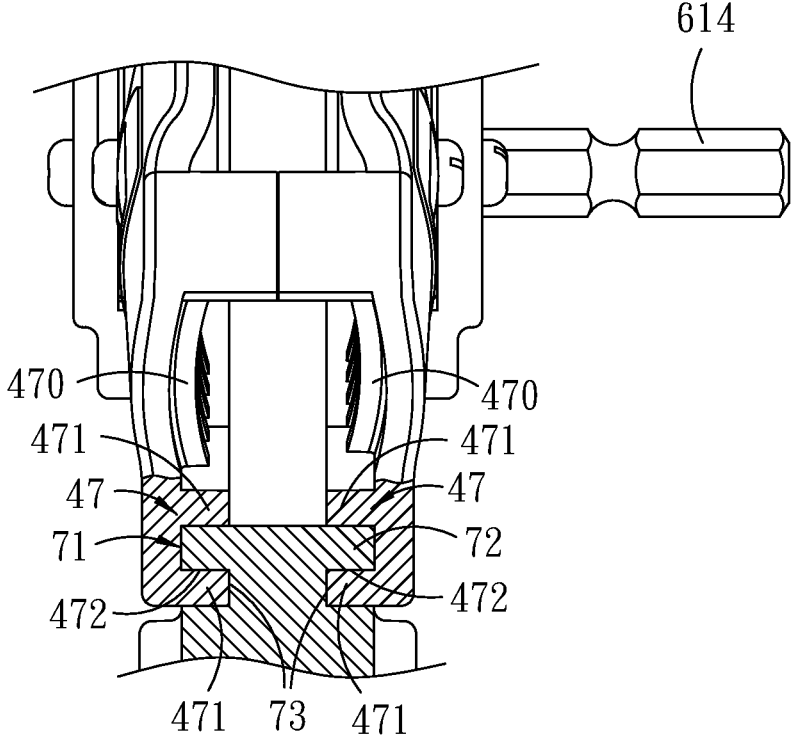
FIG. 13A is a left view of the wire puller handle assembled with the connecting rack of the take-up and pay-off device of FIG. 12.
Figure 13B:
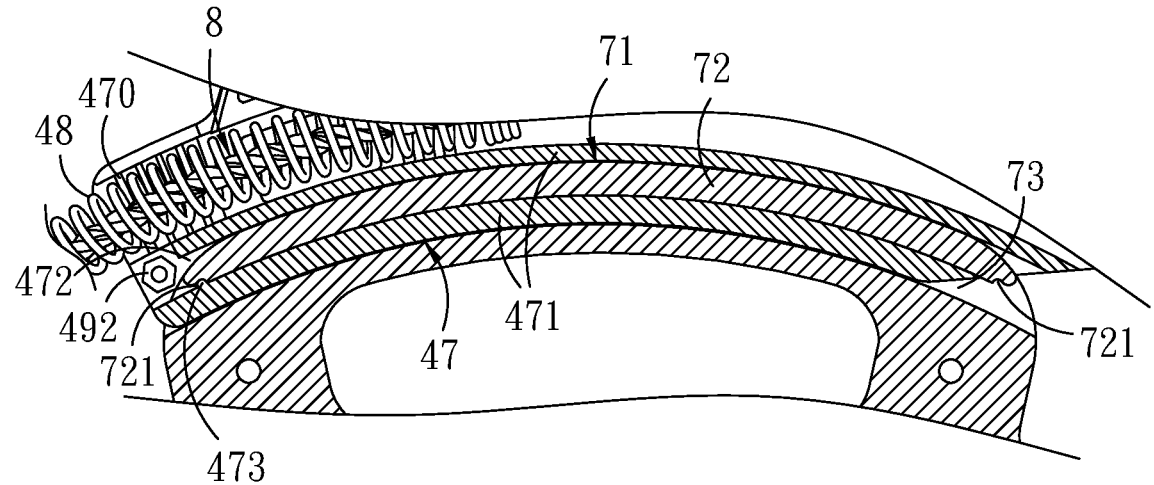
FIG. 13B is a front view of the wire puller handle assembled with the connecting rack of the take-up and pay-off device of FIG. 13A.
Figure 14:
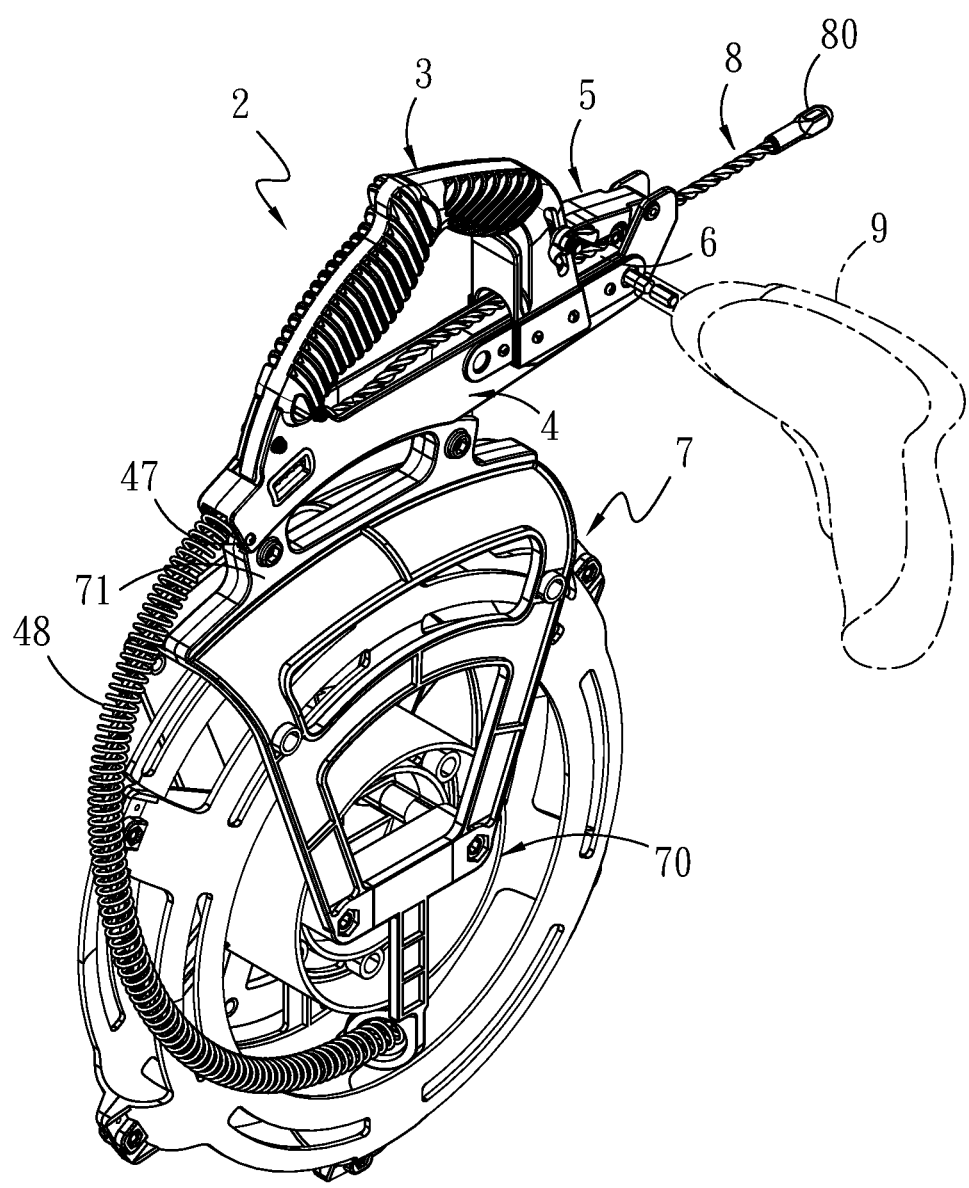
FIG. 14 is a schematic assemble view of the wire puller handle assembled with the connecting rack of the take-up and pay-off device of FIG. 13A.

Please refer to FIG. 7, FIG. 13A and FIG. 13B, each of the two base shelves 41 includes a protruding member 45 at one end close to the support projection 44, and a fixing portion 46 located opposite to the protruding member 45. The protruding member 45 includes a shaft hole 451. The fixing portion 46 includes a locking section 461 protruding located above thereof, and a third aperture 463 located at one end of each of the two base shelves 41 in opposition to the protruding member 45, wherein the locking section 461 is provided with a plurality of screw holes 462, and the plurality of screw holes 462 are fixed to the plurality of second fixing holes 321 by a plurality of second fixing members 322, so that the connection member 32 is assembled with two fixing portions 46 of the two base shelves 41. Further, the fixing portion 46 includes an embedding portion 47 and a plurality of protruding strips 470. The embedding portion 47 is provided in the inner space and located at a side opposite to the plurality of screw holes 462. The embedding portion 47 is designed to match with shapes of a side opposite to the plurality of screw holes 462 of the fixing portion 46, in this embodiment, the side opposite to the plurality of screw holes 462 of the fixing portion 46 is designed in a curved shape, but the invention is not limited thereto. The plurality of protruding strips 470 are arranged at intervals in the inner space and located between the plurality of screw holes 462 and the embedding portion 47 to position a spiral pipe 48 screwed therein, which is convenient for the pull cord 8 passing through the spiral pipe 48.

Figure 5:
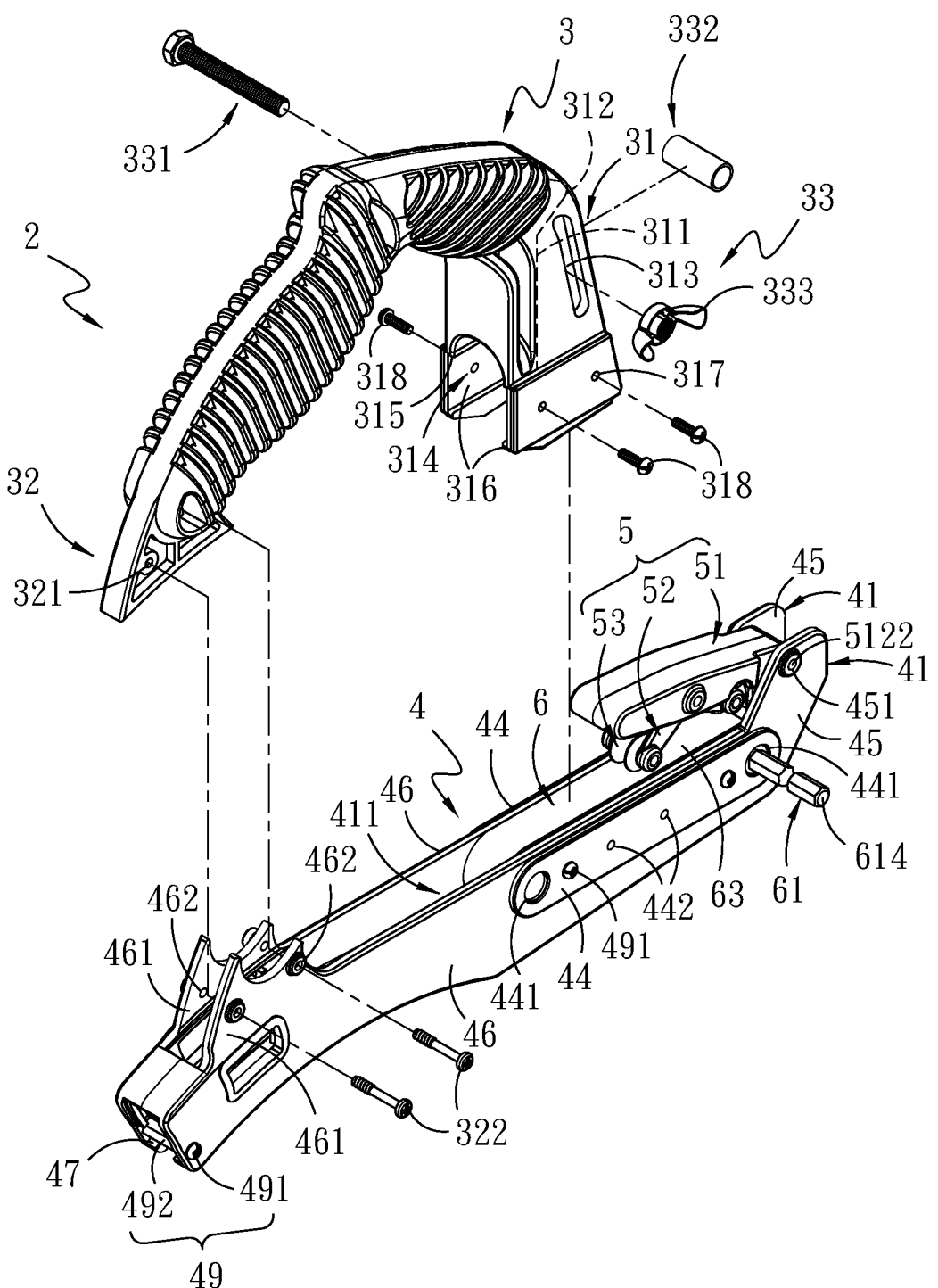
FIG. 5 is an exploded view of a wire puller handle of the present invention.
Figure 6:
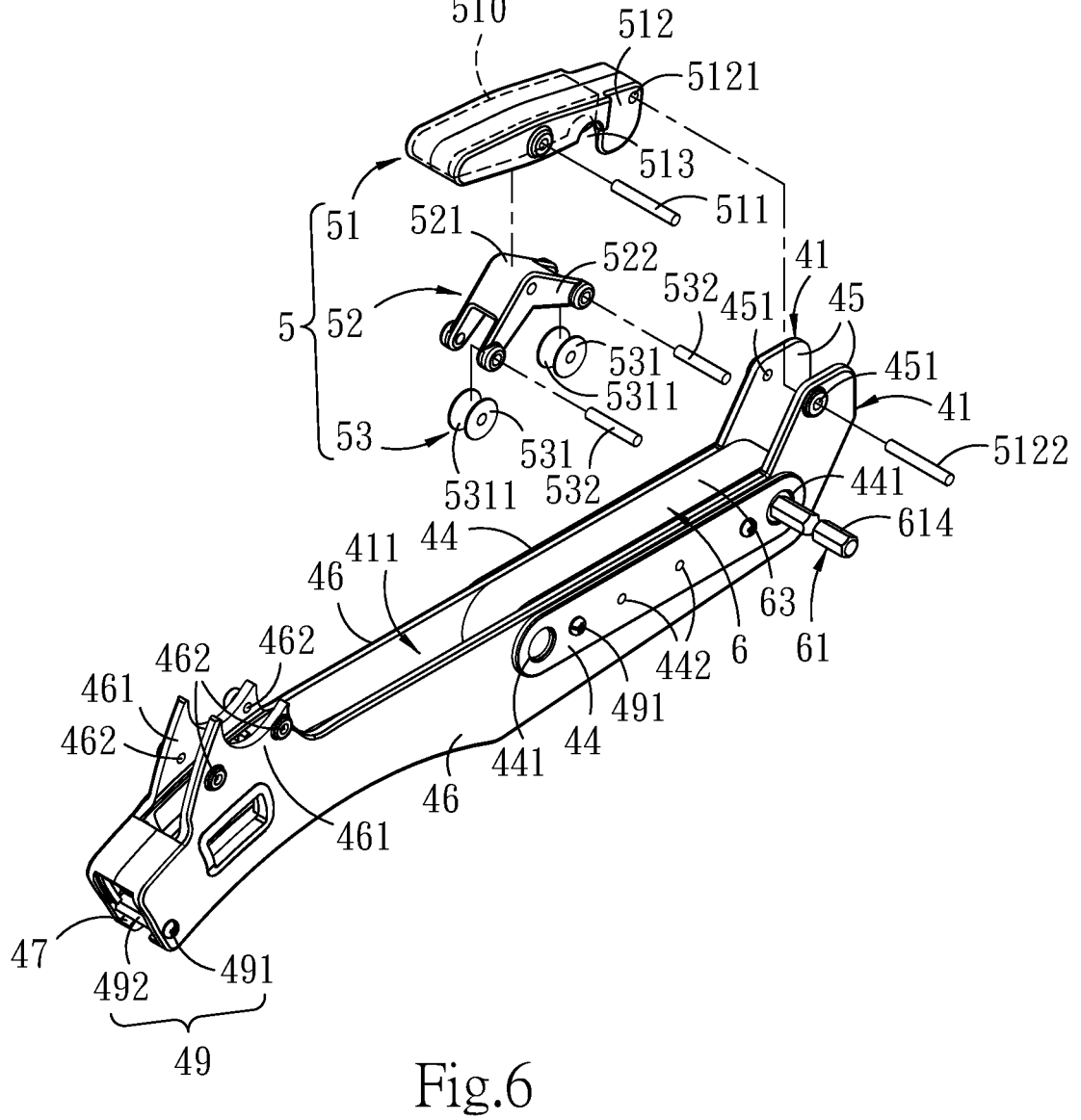
FIG. 6 is an exploded view of a base, a pinch roller set, and a guiding roller set of FIG. 5.

Please refer to FIG. 5, FIG. 6, and FIG. 7, the base 4 further includes a plurality of spacer elements 49. Each of the plurality of spacer elements 49 is provided with two screw bolts 491 and a sleeve 492. Two fixing portions 46 of the two base shelves 41 are connected by one of the plurality of spacer elements 49 by respectively penetrating the two third apertures 463 with the two screw bolts 491 and screwing with the sleeve 492, thereby the sleeve 492 shores up between the two fixing portions 46 of the two base shelves 41. The two support projections 44 and the two projections 43 of the two base shelves 41 are connected by two of the plurality of spacer elements 49 by respectively penetrating the second holes 443 and the first holes 433 with the screw bolts 491 and screwing with the sleeves 492, thereby the sleeves 492 shores up between the two support projections 44 of the two base shelves 41 and the two projections 43.

Please refer to FIG. 5, FIG. 6, FIG. 7, FIG. 8, and FIG. 9A, the pinch roller set 5 is pivotally connected to one end of the base 4, the pinch roller set 5 is arranged below the adjustment part 33, and a position of the pinch roller set 5 is limited by the adjustment part 33. The pinch roller set 5 includes a cover part 51 pivotally connected at one end of the base 4, a rotating body 52 pivotally connected to the cover part 51, and two pinch rollers 53 are respectively pivoted at two ends of the rotating body 52, wherein the cover part 51 includes a recessed space 510, a shaft rod 511, a shaft joint body 512 disposed at one end of the cover part 51, and two concave edges 513 respectively adjacent to two sides of the shaft joint body 512; the rotating body 52 includes a convex top member 521 and two convex arms 522 respectively and downwardly disposed along two sides of the convex top member 521; the two pinch rollers 53 respectively include a roller 531 and a shaft stick 532, wherein an outer periphery of the roller 531 forms an annular concave arc groove 5311. In detail, the recessed space 510 of the cover part 51 is provided for the convex top member 521 of the rotating body 52 to be placed therein, and the convex top member 521 is pivotally connected to the cover part 51 by the shaft rod 511 passed from one side to the other side of the cover part 51, the two convex arms 522 move left and right in the cover part 51 with the convex top member 521 as an axis, and the two pinch rollers 53 are respectively pivoted in the two convex arms 522. The two concave edges 513 are provided for one of the two pinch rollers 53 close to the shaft joint body 512 of the cover part 51 to be accommodated.

Further, the shaft joint body 512 includes two fourth apertures 5121 corresponding to the two shaft holes 451 of the protruding member 45, and a rod 5122. When assembling the grip 3 and the pinch roller set 5 on the base 4, the rod 5122 of the shaft joint body 512 passes through two shaft holes 451 of two protruding member 45 and the two fourth apertures 5121 of the shaft joint body 512 therebetween, so that two sides of the shaft joint body 512 of the cover part 51 are respectively pivoted to two protruding members 45 of the two base shelves 41. On another hand, the sleeving and fixing frame 31 covers one end of the cover part 51 opposite to the shaft joint body 512 to assemble with the base 4, one end of the cover part 51 opposite to the shaft joint body 512 is movable up and down inside the accommodating space 311, the first sleeve 332 can be arranged in the sleeving and fixing frame 31 and above one end of the cover part 51 opposite to the shaft joint body 512 by adjusting and moving the first bolt 331 driven by the rotary knob 333.

Please refer to FIG. 5, FIG. 6, FIG. 7, and FIG. 8, the guiding roller set 6 includes a first guiding roller 61, a second guiding roller 62, and a belt 63, wherein the first guiding roller 61 and the second guiding roller 62 are located in the inner space, and the belt 63 is located outside the first guiding roller 61 and the second guiding roller 62 and is driven by the first guiding roller 61 and the second guiding roller 62 to rotate. The first guiding roller 61 is pivotally connected to one end of the two projections 43 and can be driven by an external power 9 for rotation. The first guiding roller 61 includes a driving gear 611 and two first bushes 615, and the driving gear 611 is provided with two first convex parts 612 and four first blocks 613, wherein the two first convex parts 612 are respectively located at two ends of the driving gear 611, and outer diameters of the two first convex parts 612 is smaller than that of the driving gear 611. Two ends of the driving gear 611 are respectively provided with two of four first blocks 613, and two first blocks 613 at each of two ends of the driving gear 611 are relatively located with the two first convex parts 612 as a center. One end of the driving gear 611 is provided with a long shaft rod 614 protruding from one of the two first convex parts 612, and the long shaft rod 614 is provided for connecting with an output end of the external power 9 to drive the pull cord 8 between the belt 63 and the two pinch rollers 53 for stable conveyance. Each of the two first bushes 615 is provided with a hollow interior 616 for each of the two first convex parts 612 of the driving gear 611 to be placed therein, one side of each of the two first bushes 615 facing the driving gear 611 is provided with a first abutting edge 617, and the first abutting edge 617 is provided with two first notches 618 opposite to each other for the two first blocks 613 at one end of the driving gear 611 to engage so that each of the two first bushes 615 rotates together with the driving gear 611. Further, the two first convex parts 612 at two ends of the driving gear 611 are respectively sleeved in two hollow interiors 616 of the two first bushes 615, and two first bushes 615 are respectively engaged with the two first through holes 431 of the two projections 43 and the two second through holes 441 of the two support projections 44 to be pivotally connected with the two base shelves 41.

The second guiding roller 62 is pivoted to the other end of the two projections 43. The second guiding roller 62 includes a driven gear 621 and two second bushes 624, and the driven gear 621 includes two second convex parts 622 and four second blocks 623, wherein the two second convex parts 622 are respectively located at two ends of the driven gear 621, and outer diameters of the two second convex parts 622 is smaller than that of the driven gear 621. Two ends of the driven gear 621 are respectively provided with two of four second blocks 623, and two second blocks 623 at each of two ends of the driven gear 621 are relatively located with the two second convex parts 622 as a center. Each of the two second bushes 624 is provided with a second hollow interior 625 for the two second convex parts 622 of the driven gear 621 to be placed therein, one side of each of the two second bushes 624 facing the driving gear 611 is provided with a second abutting edge 626, and the second abutting edge 626 is provided with two second notches 627 opposite to each other for the two second blocks 623 at one end of the driven gear 621 to engage so that each of the two second bushes 624 rotates together with the driven gear 621. Further, the two first convex parts 612 at two ends of the driven gear 621 are respectively sleeved in two second hollow interiors 625 of the two second bushes 624, and two second bushes 624 are respectively engaged with the two first through holes 431 of the two projections 43 and the two second through holes 441 of the two support projections 44 to be pivotally connected with the two base shelves 41.

Please refer to FIG. 7, FIG. 8, FIG. 9A, FIG. 9B, and FIG. 9C, the belt 63 is provided with a rack 631 therein, and the rack 631 of the belt 63 is relatively meshed with the driving gear 611 of the first guiding roller 61 and the driven gear 621 of the second guiding roller 62 for rotation, and at the time, the adjustment part 33 adjusts the two pinch rollers 53 to equally press the pull cord 8 on the belt 63 so that the pull cord 8 is also conveyed therewith.

Figure 10:
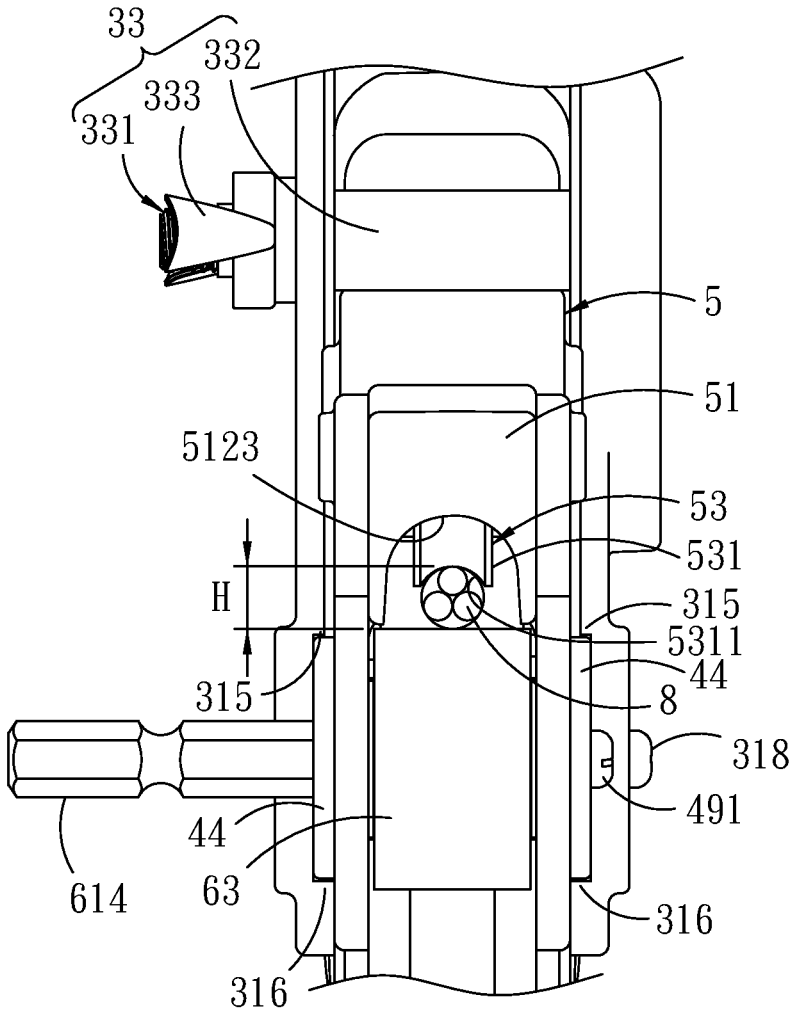
FIG. 10 is a right view of the pinch roller set and the guiding roller set of FIG. 5.
Figure 11A:
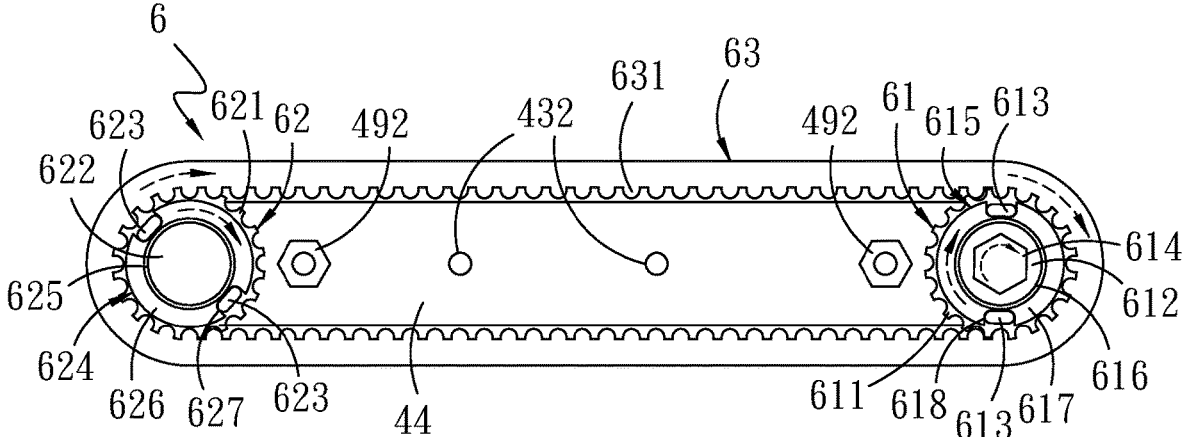
FIG. 11A is a front view of the guiding roller set of FIG. 5 clockwise rotating.
Figure 11B:
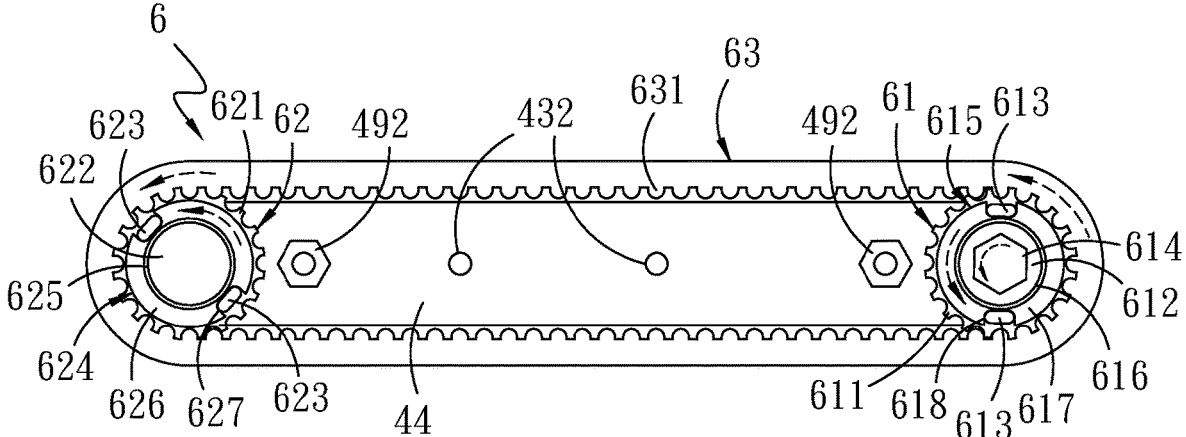
FIG. 11B is a front view of the guiding roller set of FIG. 5 counter-clockwise rotating.
Figure 12:
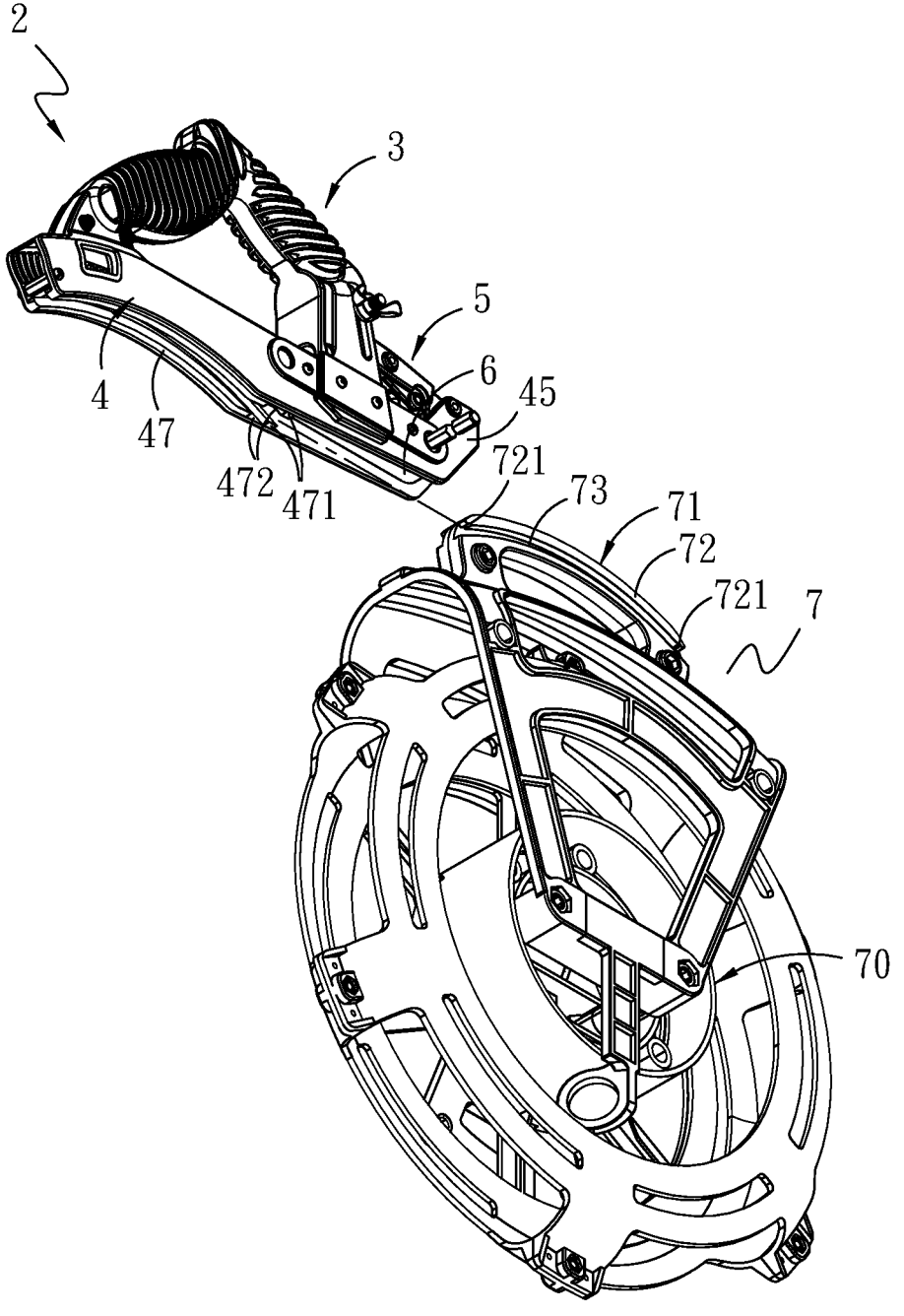
FIG. 12 is a disassemble schematic view of the wire puller handle of FIG. 5 and a connecting rack of the take-up and pay-off device.

Please refer to FIG. 10 and FIG. 11A, when the long shaft rod 614 rotates clockwise, the driving gear 611, the driven gear 621, and the pull cord 8 are driven by the long shaft rod 614 to rotate clockwise; further, as shown in FIG. 11B, when the long shaft rod 614 rotates counterclockwise, the driving gear 611, the driven gear 621, and the pull cord 8 are driven by the long shaft rod 614 to rotate counterclockwise.

Please refer to FIG. 5, FIG. 6, FIG. 7, FIG. 8, and FIG. 10, the shaft joint body 512 further includes a concave arc opening 5123 located at one end thereof close to two protruding members 45. Further, the concave arc opening 5123 is larger than the annular concave arc groove 5311 of the roller 531, as shown in FIG. 10.

According to the above, the grip 3 can be made of plastic materials so that shapes of the grip 3 are varied and ergonomic, which is also convenient and ideal for use for electricians to hold the grip 3 in their hands at work sites. Besides, the two pinch rollers 53 can be made of metal materials so that the two pinch rollers 53 are not easy to be abrasion by reciprocally rubbing by a rough surface of the pull cord 8.

Please refer to FIG. 7, FIG. 8, FIG. 12, FIG. 13A, FIG. 13B, and FIG. 14, the embedding portion 47 further includes a slide rail 471 and a third block 472 arranged below the slide rail 471 at one end close to the third aperture 463. The take-up and pay-off device 7 is provided with a connecting rack 71 above thereof, the connecting rack 71 includes two third convex parts 72 respectively arranged at two sides thereof, and two channels 73 respectively arranged below the two third convex parts 72, wherein each of the two third convex parts 72 is provided with a recessed edge 721 at each end. The two third convex parts 72 are respectively embedded with two slide rails 471 of two embedding portions 47, and the recessed edge 721 at one end of each of the two third convex parts 72 is snapped by the third block 472 of the embedding portion 47 of each of the two base shelves 41, which prevents the wire puller handle 2 from falling off from the connecting rack 71. In other words, two embedding portions 47 of the wire puller handle 2 are embedded with the connecting rack 71 of the take-up and pay-off device 7 so that the wire puller handle 2 is combined with the take-up and pay-off device 7 for use. By such an arrangement, the invention is convenient for the electricians to operate the wire puller handle 2 for conveyance of the pull cord 8 through a rotating unit 70 in the take-up and pay-off device 7.

Figure 15:
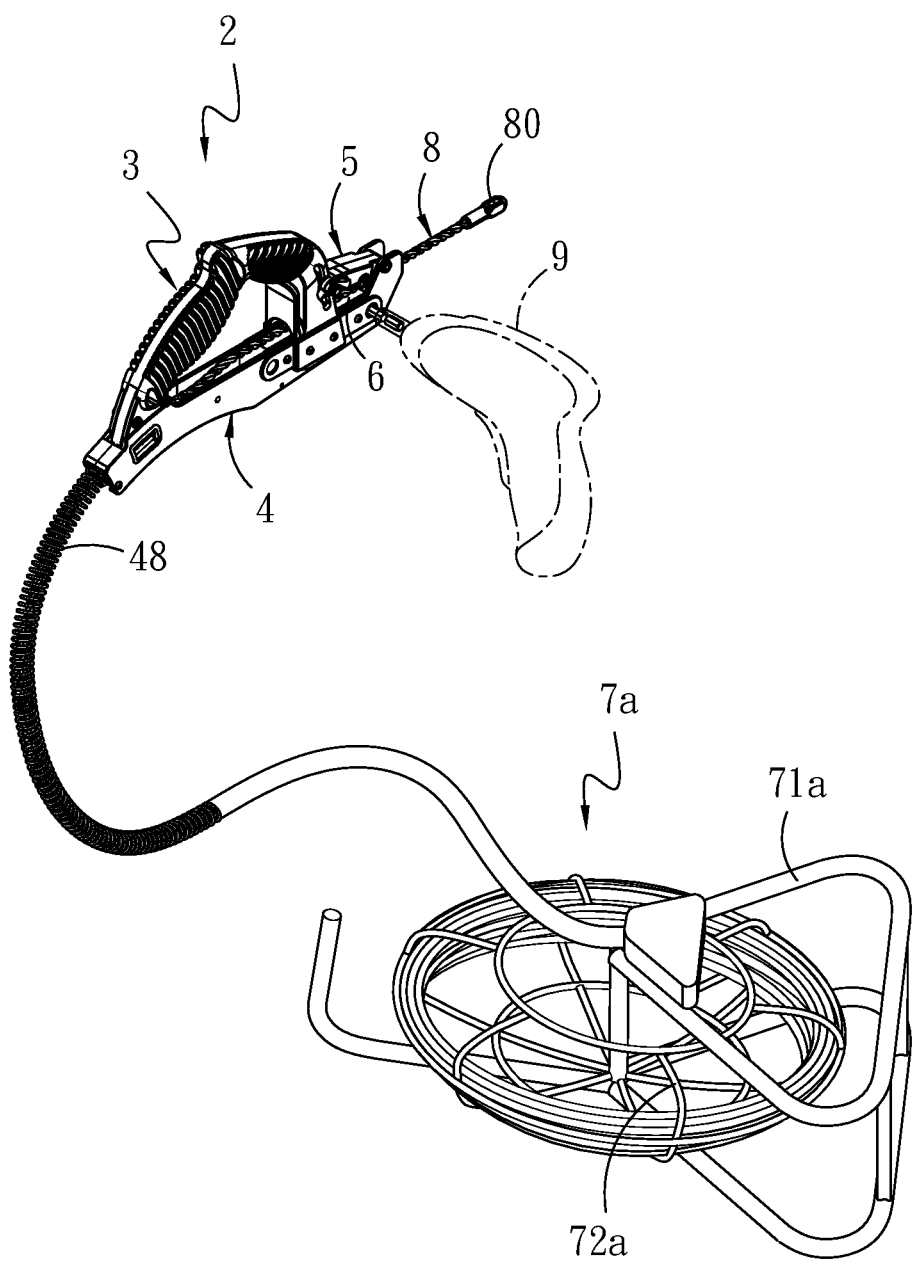
FIG. 15 is a schematic assemble view of the wire puller handle of the present invention assembled with another take-up and pay-off device in another embodiment.

Please refer to FIG. 15, the invention further provides an embodiment related to a take-up and pay-off device 7a, comprising a frame 71a and a rotating shaft assembly 72a for conveyance of the pull cord 8.

Figure 9A:
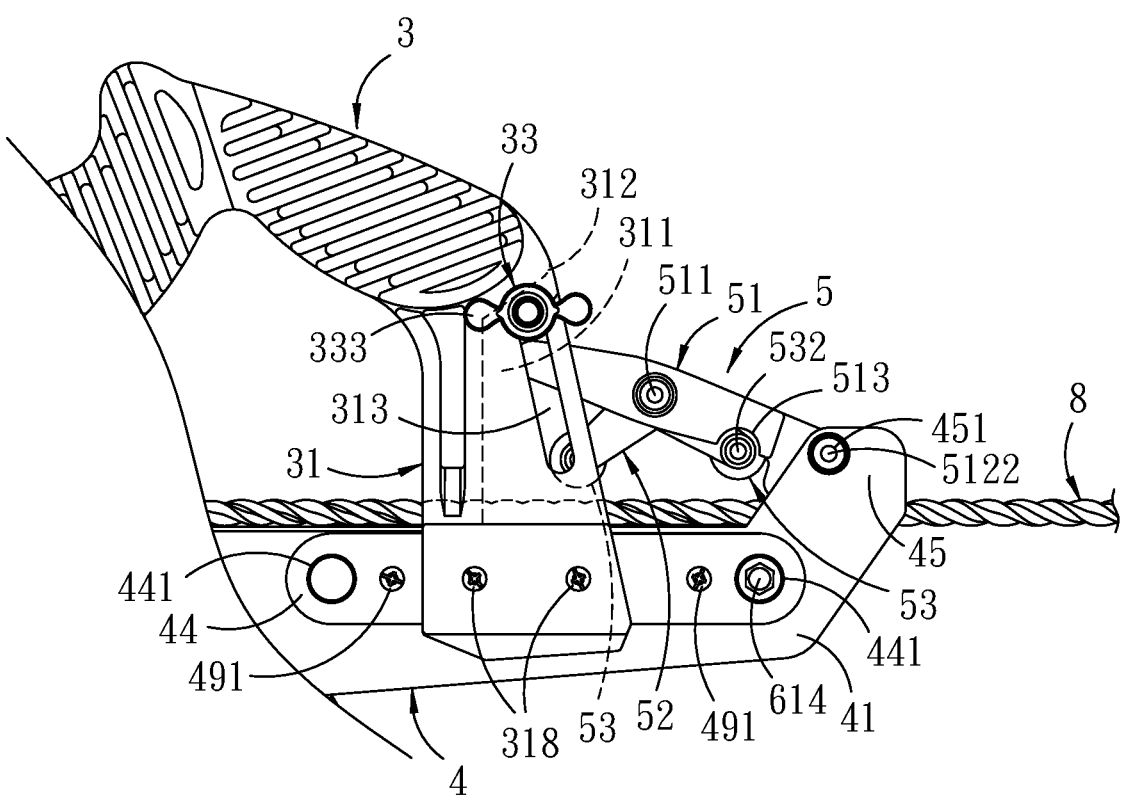
FIG. 9A is a front view of adjusting an adjustment part to limit the pinch roller set of FIG. 5.
Figure 9B:
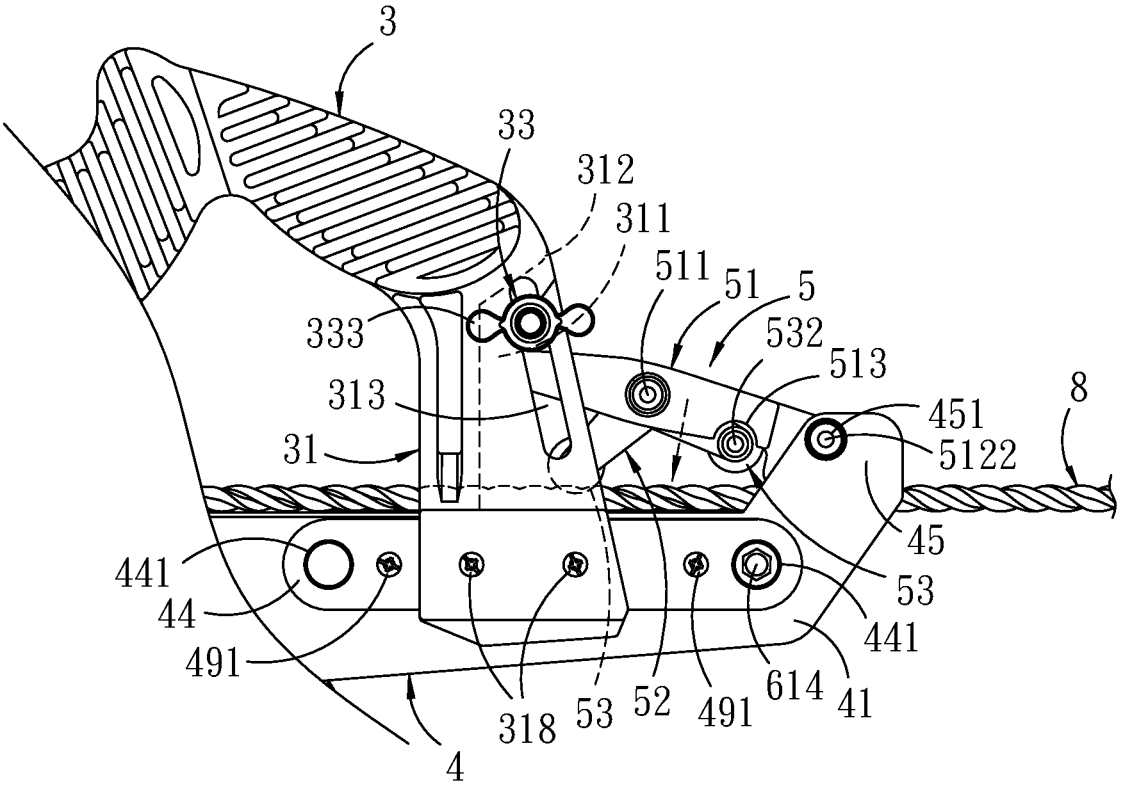
FIG. 9B is a front view of a left pinch roller of the pinch roller set pressing a pull cord in advance of FIG. 9A.
Figure 9C:
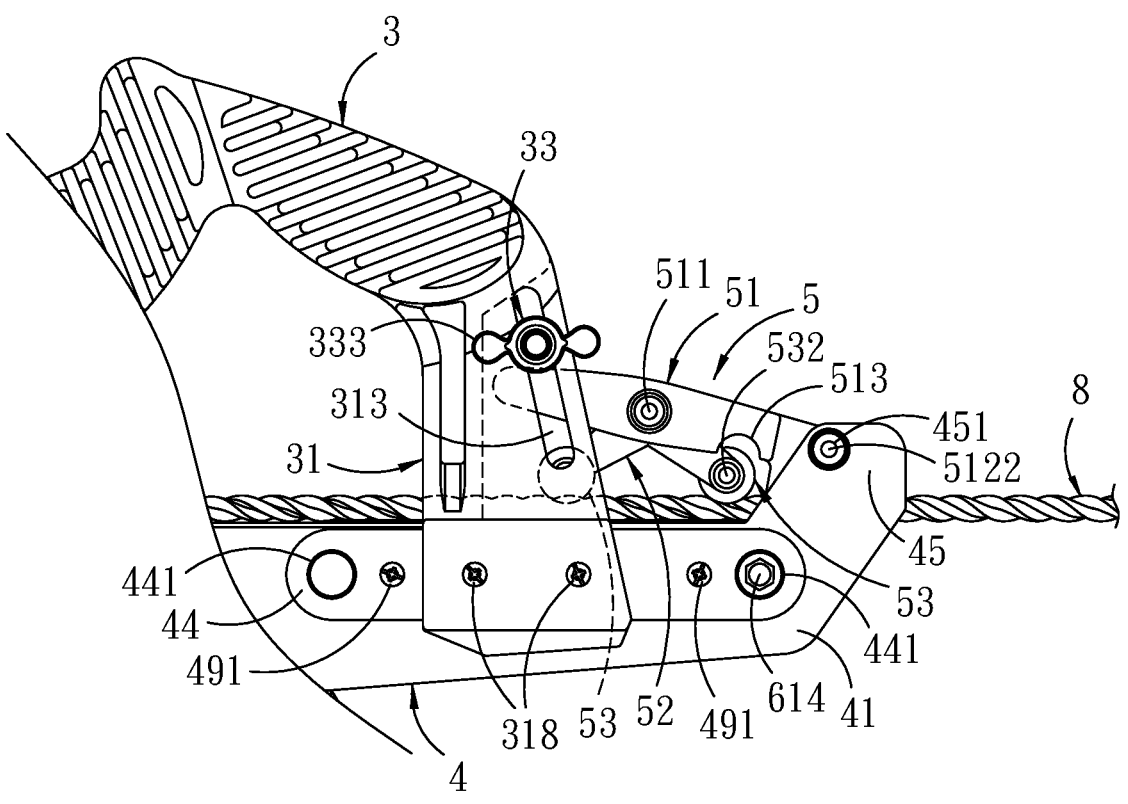
FIG. 9C is a front view of two pinch rollers of the pinch roller set pressing the pull cord of FIG. 9B.

Please refer to FIG. 5, FIG. 6, FIG. 7, FIG. 8, FIG. 9A, FIG. 9B, FIG. 9C, FIG. 10, FIG. 11A, FIG. 11B, and FIG. 14. To comply with different wire diameters and thicknesses of the pull cord 8, the rotary knob 333 is initially loosened from the first bolt 331 to move the position of the adjustment part 33 in the two adjustment slots 313, and one end of the cover part 51 opposite to the shaft joint body 512 inside the accommodating space 311 is moved up, and the two convex arms 522 is moved toward to the shaft joint body 512 until one of the two pinch rollers 53 close to the shaft joint body 512 is accommodated in the two concave edges 513 of the cover part 51 so that a gap H defined from the belt 63 to a lowest position of two annular concave arc grooves 5311 of two rollers 531 becomes bigger, as shown in FIG. 9A. After that, the pull cord 8 from the spiral pipe 48 passes through the two annular concave arc grooves 5311 of two rollers 531 and the concave arc opening 5123 of the shaft joint body 512. After the pull cord 8 is installed, the position of the adjustment part 33 is adjusted downward to press the cover part 51 to move downward simultaneously, and one of the two pinch rollers 53 opposite to the shaft joint body 512 is moved to press the pull cord 8, as shown in FIG. 9B. Then the adjustment part 33 and the cover part 51 are further moved downward, and one of the two pinch rollers 53 close to the shaft joint body 512 is not accommodated in the two concave edges 513 of the cover part 51 and presses the pull cord 8, such that the two pinch rollers 53 simultaneously press the pull cord 8 to abut the belt 63 and the gap H is appropriate for conveyance of the pull cord 8 pressed by the two pinch rollers 53 equally. Then the rotary knob 333 is screwed with the first bolt 331 to fix the position the adjustment part 33 in the two adjustment slots 313, which makes the first sleeve 332 is abutted against two inner sides of the sleeving and fixing frame 31, as shown in FIG. 9C.

The output end of the external power 9 is connected to the long shaft rod 614 and rotates in a clockwise direction or a counterclockwise direction to convey the pull cord 8 toward a direction of the first guiding roller 61 or the second guiding roller 62, wherein the driving gear 611 and the driven gear 621 are driven by the long shaft rod 614 and the belt 63 to rotate simultaneously. The electricians operate the wire puller handle 2 to convey the pull cord 8 in the take-up and pay-off device 7 (7a) into a closed conduit installed in a house. In an embodiment, one end of the pull cord 8 in the take-up and pay-off device 7 (7a) includes a pull cord head 80 which is configured to tie a wire, and the pull cord head 80 can be conveyed into the closed conduit installed in the house, which is convenient for the electricians to smoothly and stably operate the wire puller handle 2 at the work sites.

What is claimed is:

1. A wire puller handle, provided for conveyance of a pull cord, comprising:

a grip comprising an adjustment part connected to one end of the grip;

a base provided with an inner space, the grip connected to a top of the base;

a pinch roller set pivotally connected to one end of the base and arranged below the adjustment part, and a position of the pinch roller set limited by the adjustment part, wherein the pinch roller set comprises a cover part pivotally connected at one end of the base, a rotating body pivotally connected to the cover part, and two pinch rollers are respectively pivoted at two ends of the rotating body; and a guiding roller set comprising a first guiding roller, a second guiding roller and a belt, the first guiding roller and the second guiding roller located in the inner space, and the belt located outside the first guiding roller and the second guiding roller and driven to rotate, wherein the first guiding roller further comprises a long shaft rod protruding from one end of the first guiding roller, and the wire puller handle is configured to drive the pull cord between the belt and the two pinch rollers by a rotation of the long shaft rod.

2. The wire puller handle as claimed in claim 1, wherein the grip further comprises a sleeving and fixing frame located at one end thereof, and a connection member located at the other end thereof, the sleeving and fixing frame comprises an accommodating space located at one side thereof, an opening is communicated to the accommodating space, two adjustment slots are respectively located at two sides of the sleeving and fixing frame to communicate the accommodating space, an assembly slot is located below the sleeving and fixing frame to communicate the accommodating space, the assembly slot further comprises an abutting section and a guiding section located below the abutting section, the abutting section and the guiding section are respectively communicated with the accommodating space to assemble with the base, the guiding section is provided with a plurality of first fixing holes, and the connection member is provided with a plurality of second fixing holes, wherein the adjustment part of the grip comprises a first bolt passing through the two adjustment slots, a first sleeve is located in the accommodating space and penetrated by the first bolt to abut against two inner sides of the sleeving and fixing frame, and a rotary knob used to screw with the first bolt.

3. The wire puller handle as claimed in claim 2, wherein the base further comprises two base shelves arranged at intervals and opposed to each other, each of the two base shelves is made of plastic materials and laterally formed with a placement groove for a projection made of metal materials to be placed into, and an exterior of each of the two base shelves provided with a support projection corresponding to the placement groove, wherein the projection is provided with two first through holes respectively arranged at two ends thereof, two first apertures arranged between the two first through holes, and two first holes respectively arranged between one of the two first through holes and one of the two first apertures, the support projection is provided with two second through holes respectively arranged at two ends thereof, two second apertures arranged between the two second through holes, and two second holes respectively arranged between one of the two second through holes and one of the two second apertures, the plurality of first fixing holes of the guiding section are fixed to the two first apertures of the projection and the two second apertures of the support projection by a first fixing member so that the sleeving and fixing frame abuts against the base, each of the two shelves comprises a protruding member at one end close to the support projection, and a fixing portion located opposite to the protruding member, wherein the protruding member comprises a shaft hole, the fixing portion includes a locking section protruding located above thereof, and a third aperture located at one end of each of the two base shelves in opposition to the protruding member, and the locking section is provided with a plurality of screw holes, and the plurality of screw holes are fixed to the plurality of second fixing holes by a plurality of second fixing members so that the connection member is assembled with two fixing portions of the two shelves.

4. The wire puller handle as claimed in claim 3, wherein the base further comprises a plurality of spacer elements, each of the plurality of spacer elements is provided with two screw bolts and a sleeve, wherein the two fixing portions of the two base shelves are connected by one of the plurality of spacer elements by respectively penetrating two third apertures with the two screw bolts and screwing with the sleeve, thereby the sleeve shores up between the two fixing portions of the two base shelves, and the two support projections and the two projections of the two base shelves are connected by two of the plurality of spacer elements by respectively penetrating the second holes and the first holes with the screw bolts and screwing with the sleeves, thereby the sleeves shore up between the two support projections of the two base shelves and the two projections.

5. The wire puller handle as claimed in claim 3, wherein the cover part comprises a recessed space, a shaft rod, a shaft joint body disposed at one end of the cover part, and two concave edges respectively adjacent to two sides of the shaft joint body, the rotating body comprises a convex top member and two convex arms respectively and downwardly disposed along two sides of the convex top member, each of the two pinch roller further comprises a roller and a shaft stick, and an outer periphery of the roller is provided with an annular concave arc groove, wherein the recessed space of the cover part is provided for the convex top member of the rotating body to be placed therein, and the convex top member is pivotally connected to the cover part by the shaft rod passed from one side to the other side of the cover part, the two convex arms move left and right in the cover part with the convex top member as an axis, and the two pinch rollers are respectively pivoted in the two convex arms, the shaft joint body comprises a fourth aperture corresponding to the shaft hole of the protruding member, and a rod, and the rod of the shaft joint body passing through two shaft holes of two protruding member and the fourth aperture of the shaft joint body therebetween so that two sides of the shaft joint body of the cover part are respectively pivoted to two protruding members of the two shelves, the sleeving and fixing frame covers one end of the cover part opposite to the shaft joint body to assemble with the base, one end of the cover part opposite to the shaft joint body is movable up and down inside the accommodating space, and the first sleeve is arranged in the sleeving and fixing frame and above one end of the cover part opposite to the shaft joint body by adjusting and moving the first bolt driven by the rotary knob.

6. The wire puller handle as claimed in claim 5, wherein the shaft joint body comprises a concave arc opening located at one end thereof close to two protruding members, and the concave arc opening is larger than the annular concave arc groove of the roller.

7. The wire puller handle as claimed in claim 3, wherein the first guiding roller is pivotally connected to one end of the two projections and rotates, the first guiding roller comprises a driving gear and two first bushes, and the driving gear comprises two first convex parts and four first blocks, the driving gear of the first guiding roller is provided with the two first convex parts at two ends, the long shaft rod protrudes from one of the two first convex parts of the first guiding roller, and outer diameters of the two first convex parts is smaller than that of the driving gear, two ends of the driving gear of the first guiding roller are respectively provided with two of four first blocks, and two first blocks at each of two ends of the driving gear are relatively located with the two first convex parts as a center, each of the two first bushes is provided with a hollow interior for each of the two first convex parts of the driving gear to be placed therein, one side of each of the two first bushes facing the driving gear is provided with a first abutting edge, and the first abutting edge is provided with two first notches oppo-site to each other for the two first blocks at one end of the driving gear to engage so that each of the two first bushes rotates together with the driving gear, and the two first convex parts at two ends of the driving gear are respectively sleeved in two hollow interiors of the two first bushes, and two first bushes are respectively engaged with the two shelves with the two first through holes of the two projections and the two second through holes of the two support projections, and the second guiding roller is pivotally con-nected to the other end of the two projections, wherein the second guiding roller comprises a driven gear and two second bushes, and the driven gear comprises two second convex parts and four second blocks, the two second convex parts are respectively located at two ends of the driven gear, and outer diameters of the two second convex parts is smaller than that of the driven gear, two ends of the driven gear are respectively provided with two of four second blocks, and two second blocks at each of two ends of the driven gear are relatively located with the two second convex parts as a center, each of the two second bushes is provided with a second hollow interior for the two second convex parts of the driven gear to be placed therein, one side of each of the two second bushes facing the driving gear is provided with a second abutting edge, the second abutting edge is provided with two second notches opposite to each other for the two second blocks at one end of the driven gear to engage so that each of the two second bushes rotates together with the driven gear, the two first convex parts at two ends of the driven gear are respectively sleeved in two second hollow interiors of the two second bushes, and two second bushes are respectively engaged with the two shelves with the two first through holes of the two projections and the two second through holes of the two support projections, the belt is provided with a rack therein, and the rack of the belt relatively meshes with the driving gear of the first guiding roller and the driven gear of the second guiding roller for rotation.

8. The wire puller handle as claimed in claim 3, wherein the fixing portion comprises an embedding portion and a plurality of protruding strips, wherein the embedding por-tion is provided in the inner space and located at a side opposite to the plurality of screw holes, the embedding portion is designed to match with shapes of a side opposite to the plurality of screw holes of the fixing portion, the plurality of protruding strips are arranged at intervals in the inner space and located between the plurality of screw holes and the embedding portion, and the embedding portion further comprises a slide rail and a third block arranged below the slide rail at one end close to the third aperture.

9. The wire puller handle as claimed in claim 1, wherein the grip is made of plastic materials.

10. The wire puller handle as claimed in claim 1, wherein the two pinch rollers are made of metal materials.

* * * * *